United States Patent [19]
Smith et al.

[11] 3,768,014
[45] Oct. 23, 1973

[54] CARDIAC PACEMAKER RATE/INTERVAL COMPUTER SYSTEM

[75] Inventors: John H. Smith, Milwaukee, Wis.; James W. Conley, Scotia; Stanley E. Dworak, Mechanicville, both of N.Y.

[73] Assignee: General Electric Company, Schenectady, N.Y.

[22] Filed: Jan. 28, 1972

[21] Appl. No.: 221,696

[52] U.S. Cl............ 324/158 R, 324/78 D, 324/186
[51] Int. Cl. ......................... G01r 23/02, G04f 9/00
[58] Field of Search.................... 324/181, 186, 158, 324/78 D, 29.5; 128/419 P

[56] References Cited
UNITED STATES PATENTS
3,599,627   8/1971   Millen ........................... 128/419 P

OTHER PUBLICATIONS

Furman et al.; J. Thor. & Cardiovascular Surgery; Vol. 61 No. 5; May, 1971; pp. 827–834.
Furman et al.; J. Assn. Adv. Med. Inst.; Vol. 6 No. 2; March–April 72; p. 166.

*Primary Examiner*—Alfred E. Smith
*Attorney*—Ralph G. Hohenfeldt et al.

[57] ABSTRACT

Information signals taken directly from an implanted pacemaker or remotely by way of a telephone circuit are furnished to a computer which processes the information and displays it in digital form in terms of the pacemaker's stimulus pulse rate or, alternatively, in terms of the interval between pulses. The existing rate or interval is compared with prior measurements and is used to determine the pacemaker's residual battery life.

6 Claims, 2 Drawing Figures

CARDIAC PACEMAKER RATE/INTERVAL COMPUTER SYSTEM

BACKGROUND OF THE INVENTION

This invention relates to a system for monitoring the functional characteristics of an implanted cardiac pacemaker or pacer as it will be hereinafter called for brevity. The invention is more particularly concerned with obtaining accurate information on the rate at which the pacer is delivering stimulus pulses and on the time interval between pulses. The information is used for determining the depletion state of the battery or other source which powers the implanted pacer pulse generator.

Batteries which are used to supply timing circuits and stimulus pulse generators in implantable cardiac pacers have a substantially stable terminal potential during most of their life. However, at a certain point in time battery potential begins to decline gradually and then declines at an increasingly rapid rate. The interval between the begining of perceptible voltage fall off and the time when residual voltage is insufficient to drive the pacer is relatively short compared to the stable period and unless precautionary measures are taken there is a danger that the pacer will become inoperative suddenly. In early pacer patient management, one approach to precluding catastrophic loss of the artifical pacer stimulus was to replace the pacer routinely with a liberal margin of safety in advance of the time when battery exhaustion was predicted. Since battery life is variable from pacer to pacer, this meant that many pacers were replaced when their batteries had sufficient residual energy for several more months of operation while others had to be replaced under emergency conditions because their batteries became exhausted suddenly before the routine replacement time arrived.

Depending on circuit design which differs between manufacturers, pacers either increase or decrease their pulse rate when voltage begins to fall off. Accordingly, another approach to pacer management was to have the patient count his heartbeats or pace pulses per minute on a daily basis and report to the attending physican if any perciptible change in rate occurred. In some clinics it was also the practice to have the patient come in on a periodic basis for a pulse count or complete analysis of the pacer output. In either case, a pulse count change of one or more beats per minute had to occur before the change was observed so this method could only provide a gross determination of battery voltage change. Moreover, when the pulse rate had changed by one or more beats per minute the battery was already in the rapidly declining part of its voltage versus time curve and there was danger that battery exhaustion would be reached at any moment.

As mentioned above, at the end of the stable period when battery voltage begins to decline it proceeds to decline rapidly and reaches exhaustion in a short interval. It is therefore desirable that rate changes of as little as 0.1 beat per minute be detected since such change is a forerunner of rapidly increasing rate change and impending battery exhaustion. Such small changes in rates, of course, cannot be determined by merely counting whole numbers of beats as in the case when the count is made by the patient or by a clinician.

It has been proposed to detect incipient pacer pulse rate changes and battery voltage decline by providing each pacer patient with a device which permits transmitting his heart signals by way of a telephone to a clinical receiving station where the heartbeats per minute can be measured to an accuracy of a fraction of a beat of the interval between beats can be measured to within a few milliseconds. In one such existing system, the patient is provided with a sensor that has two hand held terminals. A potential appearing on the body coincidentally with occurrence of a pacer stimulus pulse is applied to the sensor. The sensor amplifies and differentiates the pulse signals and produces an audible click. The output speaker from the sensor is in a cradle that accommodates the patient's telephone hand set which transmits the periodic clicks to a receiver in a remotely situated clinic. The gain of the receiver is adjusted until one count is observed for each transmitted click. The counter is then switched to a mode which measures the time between clicks in milliseconds. A manual conversion of interval to pulse rate is then made by use of tables or by dividing the time interval by a suitable constant.

One disadvantage of this type of rate and interval determining system is that it requires a calculation or use of a chart to provide one type of information or the other. In addition, a clicking sound has many high frequency components which are attenuated significantly on telephone lines which have a band pass of about 300 Hz to 3 KHz. The manner in which the telephone is used also results in loss of verbal communication between the transmitting patient and the receiving station during the transmission period. Signal production by the patient's sensor is also subject to variations depending on dampness of the patient's hands when the test electrodes are gripped. Moreover, even if the sensor is electrically supplied by batteries instead of from a power line there is some danger that a current in excess of the permissible 5 microamperes may circulate through the patient's heart and adversely affect its electrical system.

SUMMARY OF THE INVENTION

An object of the present invention is to overcome the above-noted disadvantages and to provide a system for measuring and displaying pulse rate and interval of a pacer without requiring any calculation on the part of the user.

Another object of this invention is to provide a system wherein signals from an implanted pacer are coupled electromagnetically to a sensor so as to electrically isolate the sensor from the body.

A still further object of the invention is to provide a sensor which produces tone bursts corresponding with each pacer pulse where the bursts are at such frequency as to be transmitted over telephone lines with low attenuation.

Another object is to permit the transmitting patient to use the receiver and transmitter of this telephone hand set in a conventional manner concurrently with transmission of tone bursts so that two way communication may be maintained between the receiving station clinician and the patient at all times.

Still another object is to provide a receiving terminal that has an input for receiving pacer signals from a telephone and another input for directly sensing pacer signals when the patient is proximate to the receiving terminal.

A further and important object of the invention is to provide a receiving terminal which employs a counter and an arithmetic processor that cooperate to measure the interval between pacer pulses with one millisecond accuracy and the rate to within 0.1 pulses per minute and enables display of either of these factors in real time with receipt of the input signals.

How the foregoing and other more specific objects of this invention are achieved will appear in the more detailed description of a preferred embodiment of the invention which will be set forth shortly hereinafter.

Briefly stated, the new pacer rate interval computer used at the receiving station has selective inputs for electromagnetically coupling pacer signals from the receiver of a telephone set to the computer or directly from the implanted pacer if the patient is in the vicinity of the computer. In one embodiment, the computer produces clock pulses which are demarked by the occurrence of the received tone bursts that are coincident with pacer pulses. In the pulse interval measuring mode, the number of clock pulses between bursts is counted and the count is representative of the length of the interval which is displayed digitally in terms of milliseconds. In another rate measuring mode, the interval information is sent to an arithmetic unit in which division is performed by a series of subtractions of the time interval from a constant. The number of subtractions represents the pulse rate. Each subtraction is sent to an accumulator which stores the number. When the remainder is less than the constant subtrahend, the accumulator is signaled that the rate count is complete and the information is then transferred to the digital display device for direct reading of pulse rate with an accuracy of 0.1 beats per minute.

An embodiment of the invention will now be described in reference to the drawings.

DESCRIPTION OF A PREFERRED EMBODIMENT

Figure 1:
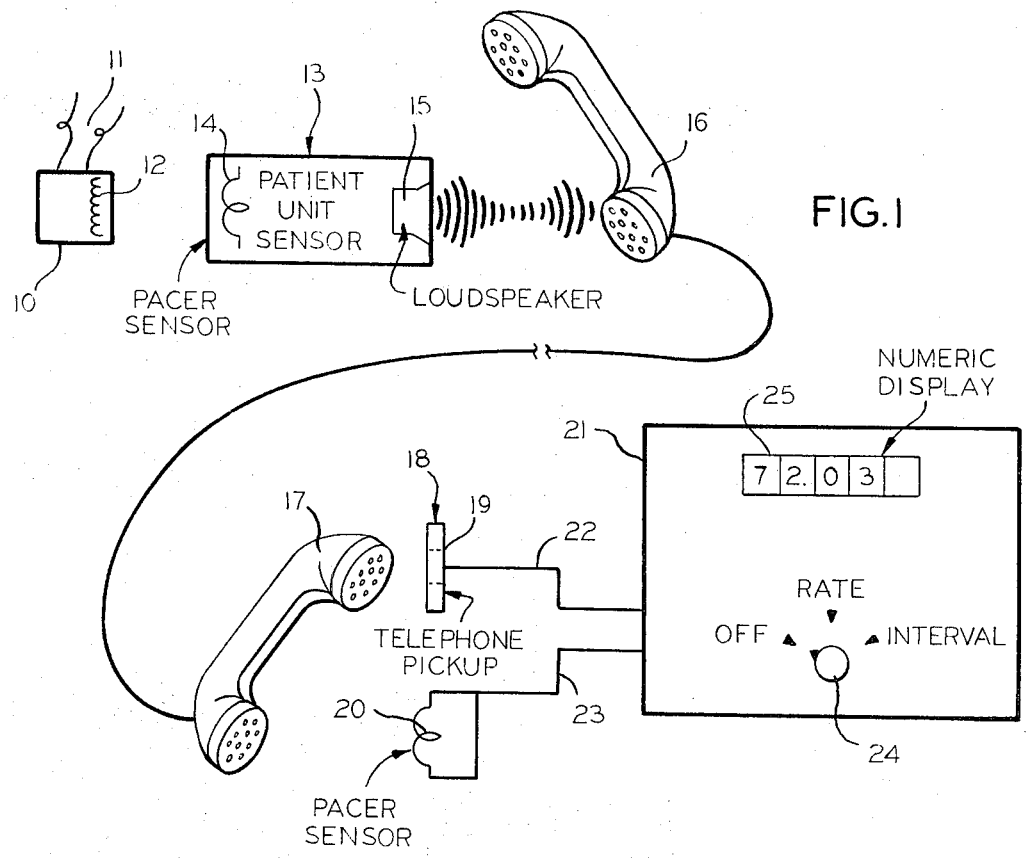
FIG. 1 is a pictorial diagram of the new pacer rate-/interval computer system.

FIG. 1 is a schematic diagram of the entire pacer rate/interval computer system. A body implanted pacer is marked generally by the numeral 10. A pair of leads 11 would connect with the patient's heart to provide stimulating pulses thereto from the pacer. The pacer has a coil 12 which radiates a magnetic field or signal each time the pacer produces a stimulus pulse. Generally pacers are designed so that stimulus pulses are produced at a rate of about 72 per minute so that the heart bears at a corresponding rate.

Each patient is provided with a sensor 13. The sensor has a coil 14 which is magnetically coupled with coil 12 in the pacer when the patient places the sensor over the region of pacer implant in the body. The voltage developed on receiving coil 14 is used to drive suitable electronic circuitry for developing a tone burst which commences at the beginning of the pace pulse and may terminate in about 50 milliseconds. The tone frequency is preferably about 2 KHz which may be transmitted over a telephone circuit with low attenuation. The tone bursts are audible to the patient from a speaker 15 which is in the patient sensor unit 13.

When the patient desires to transmit his pacer pulse information to a receiving terminal for rate and interval analysis contact is established in the usual manner of completing a telephone call. The patient then uses the telephone hand set 16 in the usual way at which time information may be exchanged with the receiving station. The pulse bursts from the loud speaker 15 are picked up by the transmitter of telephone hand set 16 while the transmitter is near the patient's mouth so that the patient may speak to the receiving terminal at any time during pulse tone transmission. Likewise, the patient can also hear instructions from the clinician at the receiving terminal and is thus readily informed when the test is complete.

The periodic tone bursts from the patient's sensor 13 are transmitted over the telephone system to a telephone hand set 17 at the receiving station. In accordance with the invention, the receiving station may also perform the pulse rate and interval analysis while the receiver of hand set 17 is at the clinician's ear and the transmitter is in the usual position for speaking. This is possible because the incoming tone bursts are picked up with a coil assembly 18 which has a central aperture 19 through which sound may be readily transmitted to the attendant's ear at the receiving terminal. The coil assembly 18 is provided with clamping means, not shown, for fastening it to the receiver of telephone 17. Pick up coil 18 does not actually sense the sound coming from the receiver of telephone 17 but, instead, senses variations in the magnetic field of the armature in the hand set which is used to drive the sound producing diaphragm.

The input terminal is also provided with a sensing coil assembly 20 which is similar to coil 14 in patient sensor 13. Coil 14 may be placed in proximity with the pacer when a patient is present at the receiving terminal. The telephone pickup 18 and the direct pacer sensor coil 20 are alternatively connectible to the information processing and display unit 21 by means of cables 22 and 23, respectively. Plugging in one cable or the other effectuates some switching in the processor unit 21 so as to set it up for processing signals from whichever pickup device 18 or 20 is being used.

The electromagnetic field from coil 12 in implanted pacer 10 exhibits a short damped oscillation or blip concurrently with initiation of a pacer stimulus pulse which is usually about 2 to 5 milliseconds in duration. This oscillation is used to demark the beginning of an approximately 50 millisecond tone burst and, hence, the starting of the processor to measure the time interval between pulses when either the remote patient sensor 13 or the local patient sensor 20 is in use.

Signal processor and display unit 21 converts incoming pulse signals from the pacer to a numeric display 25 of pulse rate in beats per minute to ±0.1 beat per minute or of time interval between the pulses in milliseconds to ±0.1 millisecond. The type of measurement and display or mode is controlled by the switch knob 24 which may be set to indicate pulse rate or interval as indicated in FIG. 1. Maximum pulse rate computable by the instrument will usually be below 300 beats per minute and maximum displayable pulse interval would be 1999.9 milliseconds.

Figure 2:
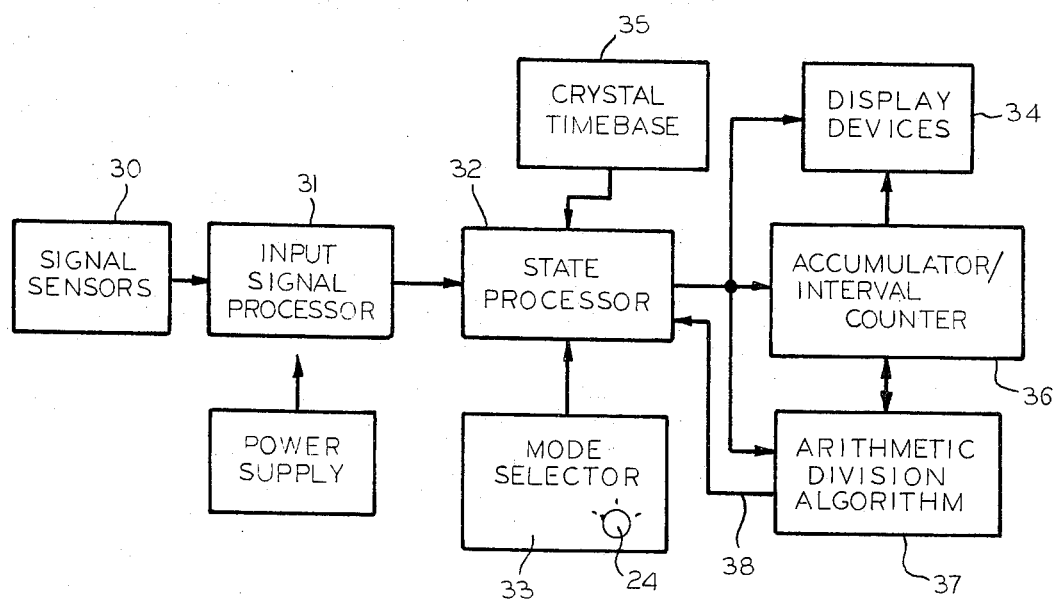
FIG. 2 is a block diagram of the pacer pulse receiving and computing terminal.

Refer now to FIG. 2 where a generalized block diagram of the signal processor and display unit 21 has its subunits represented in block form as a system which basically accomplishes the rate and interval measurements and display mentioned above.

In FIG. 2 one or the other of the remote signal sensors 18 or 20 is represented by the signal sensor block 30. As mentioned earlier, a typical signal from the telephone pickup 18 would be a 2,000 Hz tone burst commencing when the pacer pulse is initiated. A typical signal from the pacemaker sensor 20 would be the peak of a ringing signal that occurs coincidentally with the beginning of a pacer pulse. In any case, signals corresponding with pacer pulses are fed into an input signal processor block 31 whose output pulses are sharply rising short duration pulses that are coincident with the series of incoming pacer pulses.

From input signal processor 31 the pulse train is fed through a state processor 32 which governs the manner in which the signals are processed and displayed as will be explained in greater detial later.

Associated with processor 32 is a mode selector 33 which determines whether the display device 34 will display the pulse rate in beats per minute or the interval between pulses in milliseconds to ±0.1 in each case.

Also connected to state processor 32 is a crystal controlled time base producing device or clock 35. This is actually a stable oscillator which is crystal controlled. In one practical embodiment, the oscillator is governed by a crystal whose natural frequency of vibration is 4 MHz. Crystals at this frequency have been found to have better stability than those at higher and lower frequencies. Circuitry is provided in the device for dividing the frequency by four so that the basic clock frequency is 1 MHz. The mode selector 33 cooperating with state processor 32 results in further dividing the 1 MHz frequency into either a clock frequency of 16,666 Hz which is used for pulse rate measurement in the particular embodiment or into a 100 KHz clock frequency which is used for measurement of the time interval between pacer pulses. Other subdivisions of the 1 MHz clock frequency could be used as well. The chosen frequencies are high enough so as to produce pulse rate and interval measurements with the desired degree of accuracy and yet are not so high as to require use of logic devices which are extremely fast and, hence, more expensive. For present purposes it is sufficient to observe that the system in either its rate or interval measuring mode of operation counts the number of clock frequency cycles between pacer pulses and uses this information to determine the total time interval since the time for each cycle is fixed.

State processor or control unit 32 is interconnected with display device 34, an accumulator/interval counter block 36 and an arithmetic division algorithm unit 37. There is also a feed back line 38 from unit 37 to state processor 32. How these devices cooperate depends on whether the rate or interval mode of operation has been selected through mode selector 33.

The state processor 32 is essentially a control unit that controls the measurement of the time interval between pacer pulses, with the mode selector 33 it controls the clock frequency to the interval counter portion of unit 36, it generates control signals for the arithmetic division algorithm unit 37 and it also controls the accumulator interval counter to either count pacer pulse intervals or accumulate results from the arithmetic algorithm unit 37. For the sake of brevity, unit 36 will be called an accumulator when it is cooperating with arithmetic division algorithm unit 37 during pulse interval measurement and it will be called an interval counter when it is functioning in connection with measurement of the time duration between consecutive pacer pulses.

The interval counter 36 may be any suitable moderate speed electronic pulse counting device. In the interval counting mode, the state processor 32 directs the 16,666 Hz clock frequency to interval counter 36. Counting is initiated by the occurrence of a pacer pulse which is fed through the state processor to the interval counter from input signal processor 31. When a pacer pulse occurs, the interval counter 36 begins counting the number of clock frequency cycles. When the next pacer pulse occurs, it is fed through the state processor or control unit 32 which in turn terminates the clock pulse count for the particular interval. The counter contents are then transferred to display device 34 so that the interval in milliseconds can be visualized and then the counter is cleared. This process of starting a count when one pacer pulse occurs and terminating it and transferring the counter contents to the display device upon occurence of the next pacer pulse is repeated after the counter is cleared as long as the unit is turned on and the mode selector is set for the interval counting mode.

When the mode selector is set for measuring pacer pulse rate the state processor 32 directs the 100 KHz clock frequency to unit 36 which then acts as an interval counter and as an accumulator. In the rate mode, unit 36 again counts the number of clock cycles that occur between consecutive pace pulses. When the second pulse which demarks a pulse time interval occurs, the state processor 32 transmits a signal which effects transferring of the counter contents to the arithmetic division algorithm unit 37 and then clears the counter. The number of counts at known periodicity occurring within a measured time interval permits the arithmetic unit 37 to compute the pulse rate in terms of beats per minute to the nearest 0.1 beat per minute in this example. During the rate measuring mode, the number of counts per pulse interval is transferred as mentioned above to the arithmetic unit 37 for performance of a calculation which results in rate. The arithmetic unit acts on the specific count by subtracting the count from a fixed number repeatedly. The number of subtractions represents the pacer pulse rate. for each successful subtraction, a pulse is sent to the accumulator 36. Eventually the remainder is no longer large enough to successfully subtract the specific count value in which case the subtraction results in a negative number. A control pulse occurs simultaneously with this event and this is fed back through state processor 32 which signals the accumulator to stop and send its total counts or its total number of successful subtractions to the display device which then presents the information in terms of pulse rate.

Because a little time is used by the arithmetic unit 37 to compute the pulse rate after the accumulator is cleared, the interval between the next succeeding pair of pacer pulses is not counted in this embodiment. However, when the next pacer pulse occurs, the state processor 32 clears the accumulator 36 so that the interval counting process may be repeated and the arithmetic unit 37 may then compute the pulse rate.

The system permits keeping the patient's pacer pulse rate and pulse interval under close surveillance. The general practice is to have the patient record his pulse rate and pulse interval by relaying the necessary information over the telephone circuit for the first time a few weeks after the implantation is made at which time the pacer batteries and hence the pulse rate and interval are stable. Subsequently, the patient relays the information on a weekly basis and the clinician compares current measurements with the preceding measurements that are recorded. When the rapid decline phase of the battery voltage is evidenced by increasingly greater pulse rate or interval changes, replacement of the pacer is scheduled. Premature pacer replacement is obviated in those cases where the pacer batteries are still in their stable voltage period.

It will be understood that those skilled in the binary systems arts having been given the basic features and functions of the system hereinabove disclosed will be able to devise various circuits to accomplish the purposes of the different functional blocks so such circuits need not be described in detail. Accordingly, the scope of the invention is to be determined only by construing the claims which follow.

We claim:

1. A system for measuring and displaying the repetition rate and interval of pulses produced by a body-implantable cardiac pacer which radiates electromagnetic signals to outside of the body, comprising:
   a. electromagnetic signal sensing means for receiving said radiated signals on the outside of the body,
   b. means controlled by said signal receiving means for producing audible tone signals in correspondence with said radiated signals, said tone signals being of such frequency and of sufficient duration to be readily heard by the human ear,
   c. sensor means remote from said tone signal producing means and constructed and arranged for being coupled telephonically with said tone signal producing means, said sensor means including means responsive to telephonically received signals by producing interval demarking signals that correspond with pacer pulses,
   d. means for producing electric signals representative of the time between said interval demarking signals,
   e. means for converting said time representative signals to signals representative of the rate of occurrence of said interval demarking signals and said pacer pulses, and
   f. means selectively responsive to either of said rate or interval representative signals by displaying numerals corresponding with said last named signals.

2. The invention set forth in claim 1 wherein:
   a. said tone signals have a fundamental frequency of about 2,000 Hz.

3. The invention set forth in claim 1 wherein:
   a. said tone signals have a duration of up to about 50 milliseconds.

4. The invention set forth in claim 1 including:
   a. clock pulse generator means,
   b. control means receiving interval demarking signals and clock pulses from said generator means,
   c. clock pulse counter means receiving and counting clock pulses during intervals that are determined by said control means in correspondence with said time demarking signals,
   d. arithmetic processor means coupled with said control means and said counter means, said processor being adapted to receive the count of said counter means during a time demarked interval in response to said control means,
   e. said arithmetic processor performing a computation between a constant representing signal and a signal representing the counts in a time interval repeatedly upon the receipt thereof and eventually producing a result signal smaller in value than the constant representing signal,
   f. accumulator means receiving and storing a signal from said processor corresponding with each computation, said control means stopping the accumulation of counts in response to said smaller result being attained,
   g. said control means responding to occurrence of said result by transferring the stored counts from said accumulator to said display means, said stored counts being representative of the rate of said pacer pulses.

5. The system set forth in claim 1 wherein:
   a. said remote sensor means includes:
      i. coil means adapted to receive magnetic signals radiated directly from a pacer that is proximate to said coil means, signals induced in said coil means also controlling said sensor means to produce interval demarking signals that correspond with pacer pulses.
   a. pacer sensor means including means for receiving electromagnetic signals radiated from a cardiac pacer in correspondence with stimulus pulses occuring in said pacer, 6. For use in a system that includes a receiving terminal at which are measured and displayed the pulse rate and interpulse time intervals of cardiac pacer stimulus pulses from a remotely located subject:
   b. means controlled by said signal receiving means for initiating tone signals in bursts of such duration as to be readily heard by the human ear but of lesser duration than the time between stimulus pulses, said tone signals having a frequency substantially in the range of 300 Hz to 3,000 Hz, and
   c. speaker means driven by said tone signals to emit audible tone bursts corresponding with each tone signal burst that is initiated by a pacer pulse,
   d. said tone bursts being receivable by a telephone for being transmitted to said receiving terminal.

* * * * *

UNITED STATES PATENT OFFICE
CERTIFICATE OF CORRECTION

Patent No. 3,768,014          Dated October 23, 1973

Inventor(s) John H. Smith, James W. Conley and Stanley E. Dworak

It is certified that error appears in the above-identified patent and that said Letters Patent are hereby corrected as shown below:

Claim 5, lines 38-41 delete "a. pacer sensor means including means for receiving electromagnetic signals radiated from a cardiac pacer in correspondence with stimulus pulses occurring in said pacer,".

Claim 6, after line 45 insert ---a. pacer sensor means including means for receiving electromagnetic signals radiated from a cardiac pacer in correspondence with stimulus pulses occurring in said pacer,---.

Signed and sealed this 7th day of May 1974.

(SEAL)
Attest:

EDWARD M. FLETCHER, JR.
Attesting Officer

C. MARSHALL DANN
Commissioner of Patents